United States Patent [19]

Shin

[11] Patent Number: 4,952,352
[45] Date of Patent: Aug. 28, 1990

[54] PROCESS FOR PRODUCING A LOW DENSITY FOAMED POLYETHYLENE

[76] Inventor: Yong W. Shin, 150 W. 47th St., New York, N.Y. 10036

[21] Appl. No.: 303,050

[22] Filed: Jan. 27, 1989

Related U.S. Application Data

[60] Continuation of Ser. No. 27,957, Mar. 19, 1987, abandoned, which is a division of Ser. No. 744,747, Jun. 14, 1985, Pat. No. 4,746,564.

[30] Foreign Application Priority Data

Apr. 4, 1985 [KR] Rep. of Korea ................. 1985/2293

[51] Int. Cl.⁵ ............................................. B29C 47/10
[52] U.S. Cl. ........................................ 264/51; 264/53; 264/55; 264/58; 264/121; 264/145; 264/237; 264/323; 264/DIG. 13; 425/4 C
[58] Field of Search ................. 264/51, 53, 54, 55, 264/45.9, 148, 145, 323, DIG. 13, 518, 121; 425/4 C

[56] References Cited

U.S. PATENT DOCUMENTS

| | | | |
|---|---|---|---|
| 3,067,147 | 12/1962 | Rubens et al. | 264/50 X |
| 3,098,831 | 7/1963 | Carr | 264/54 |
| 3,198,859 | 8/1965 | Tomlinson | 264/55 |
| 3,393,260 | 7/1968 | Miler | 425/4 C |
| 3,819,784 | 6/1974 | Hasama et al. | 264/55 |
| 4,208,367 | 6/1980 | Wunning | 264/45.9 |
| 4,360,556 | 11/1982 | Heider | 428/131 |
| 4,370,378 | 1/1983 | Zabrocki et al. | 264/53 X |
| 4,387,169 | 6/1983 | Zabrocki et al. | 264/53 X |

FOREIGN PATENT DOCUMENTS

| | | | |
|---|---|---|---|
| 43-16310 | 7/1968 | Japan | 264/54 |
| 48-000659 | 1/1973 | Japan | 264/54 |
| 60-42022 | 3/1985 | Japan | 264/54 |

Primary Examiner—Jeffery Thurlow
Attorney, Agent, or Firm—Levisohn, Lerner & Berger

[57] ABSTRACT

A foamed and expanded low density polyethylene sheet or tube possesses both superior buoyancy and thermal resistance characteristics. The sheet or tube is made by a process including mixing a low density polyethylene with a blowing agent, surface activation agent and, preferably, a separation agent, heating the mixture at different temperatures to first melt the mixture and then gasify the blowing agent to expand the polyethylene cells, cooling the melted mass to partially harden and shrink the expanded cells, further expanding the cells by introducing a second gaseous blowing agent, cutting, extruding and cooling the expanded mass, forming a sheet or tube from the cooling mass, and finally cooling the sheet or tube for at least 24 hours. A buoyant, thermal resistant, water-repellent and moisture resistant sheet or tube results, which can be used, for example, as a liner for garments, including sports, business and military garments and other related equipment.

9 Claims, 2 Drawing Sheets

PROCESS FOR PRODUCING A LOW DENSITY FOAMED POLYETHYLENE

This application is a continuation of Ser. No. 027,957, filed Mar. 19, 1987, now abandoned, which in turn is a division of Ser. No. 744,747, filed June 14, 1985, now U.S. Pat. No. 4,746,564, issued May 24, 1988.

BACKGROUND OF THE INVENTION

Garments possessing buoyancy, cold-resistant and waterproof properties are highly desirable in a multitude of situations. Military personnel equipped with uniforms and jackets having all of these properties would find them advantageous in a number of situations. For example soldier's maneuverability in rough terrain under adverse conditions would be greatly enhanced by clothing which was both cold-resistant to protect the wearer from the elements and simultaneously facilitated crossing a river or fording a stream due to its buoyant and waterproof properties. Mountain climbers and hikers would find such garments similarly advantageous, where crossing a river, dealing with a flood, or resisting the cold are all potential encounters. To achieve their greatest utility, such garments must not only possess these various properties, but they must also be comfortable and not bulky or cumbersome.

Water sports enthusiasts would also find such garments of particular advantage. Indeed, for many activities, garments possessing buoyant, cold-resistant and waterproof properties would be ideal and find great utility.

It is known to provide various garments with foamed materials for thermal insulation. Thus, U.S. Pat. No. 2,976,539 discloses a thermally-insulated garment having an expanded, closed-cell cellular material as a lining, preferably polyvinyl chloride. The garment is thick and cumbersome and does not possess sufficient buoyancy to support a person's weight in water. Similarly, U.S. Pat. No. 3,511,743 discloses a thermal insulation laminate for space and diving suits whose core is an open or closed-cell sponge or foam. A fluid impermeable rubber or plastic skin is necessary. The laminate gives moderate mobility, but is still fairly cumbersome and does not have sufficient buoyancy to serve as a life-saving device.

Polyethylene foams have been suggested as insulation or fillers for life rafts and jackets. U.S. Pat. No. 3,067,147 suggests a low density polyethylene foam for such a purpose which is processed with 1,2-dichlorotetrafluoroethene as a foaming or blowing agent. The polyethylene and blowing agent pressure and explosively extruded into the atmosphere to form an expanded cellular mass. The product is bulky and cumbersome when used in practice. Similarly, U.S. Pat. No. 3,819,543 discloses a molded chlorinated, cross-linked polyethylene foam for use in producing floats and linings for clothing. Various known blowing and cross-linking agents are suggested for use by this reference. The molded products are thick and cumbersome.

Despite these advances, there remains a need for a thin, lightweight material for use as a liner for garments and outdoor equipment which possesses a combination of superior buoyancy, cold-resistant and water-resistant properties, without hampering the mobility of the wearer.

SUMMARY OF THE INVENTION

It is an object of the present invention to eliminate the above-mentioned drawbacks by providing a foamed, expanded low density polyethylene possessing both superior buoyancy and thermal resistance characteristics.

Another object of the present invention is to provide a process for producing a foamed, expanded low density polyethylene possessing both superior buoyancy and thermal resistance characteristics.

Yet another object of the invention is to provide a thin and lightweight lining for garments and sports, business, military and other related equipment which is not cumbersome and bulky, yet combines both superior buoyancy and thermal resistance characteristics.

These and other objects are attained in accordance with the present invention by a process comprising mixing low density polyethylene with a blowing agent, a surface activation agent and, preferably, a separation agent, heating the resultant mixture to form a softened mass, raising the temperature of the softened mass to gasify the blowing agent for foaming and expanding the cells of the polyethylene, reducing the temperature of the foamed and expanded polyethylene to partially shrink and harden the polyethylene cells, introducing a gaseous blowing agent into the polyethylene mass to cause additional foaming and expansion of the polyethylene cells, cooling the mass to a temperature suitable for cutting, cutting and heating the mass to a temperature suitable for extruding, extruding the mass, forming the mass into a sheet or tube, and cooling the sheet or tube for at least 24 hours at room temperature to form a low density polyethylene sheet or tube characterized by superior buoyancy and thermal resistance.

The present invention further comprises a foamed and expanded low density polyethylene sheet or tube produced in accordance with the process of the present invention.

The present invention further comprises a garment incorporating therein a lining of foamed and expanded low density polyethylene having a thickness ranging from about 0.5 mm to about 1 mm and a buoyancy such that about 300 g of the lining will keep more than about 130 kg of weight afloat.

In a preferred embodiment of the process according the invention, azodicarbonamide is the blowing agent, zinc oxide is the surface activation agent, ZnC is the separation agent, Freon is the gaseous blowing agent and a foamed and expanded low density polyethylene sheet is formed to be used as a liner in garments requiring buoyant, water-repellent and thermal resistant characteristics.

BRIEF DESCRIPTION OF THE DRAWINGS

The present invention will be better understood through the following detailed description of the preferred embodiments, taken in conjunction with the accompanying drawings, which schematically illustrate the process of the present invention, in which.

DETAILED DESCRIPTION OF THE PREFERRED EMBODIMENTS

Figure 1:
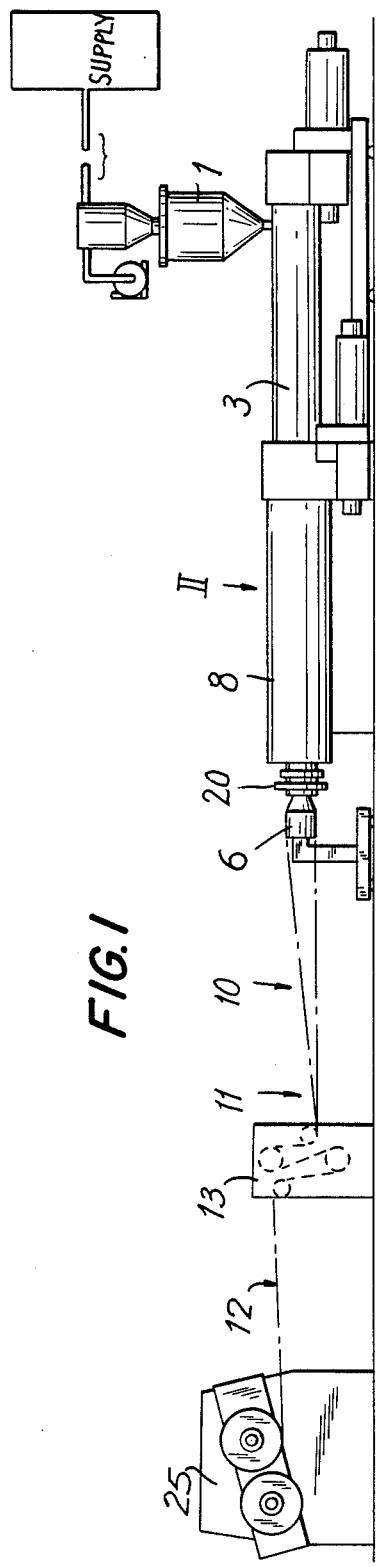
FIG. 1 is a schematic plan view of an embodiment for practicing the process of the present invention.
Figure 2:
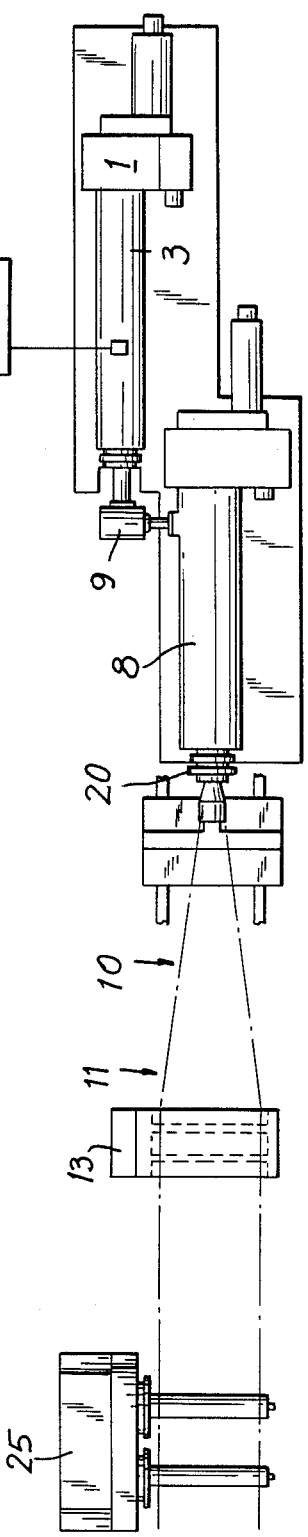
FIG. 2 is a schematic top view taken in the direction of the arrow II shown in FIG. 1.
Figure 3:
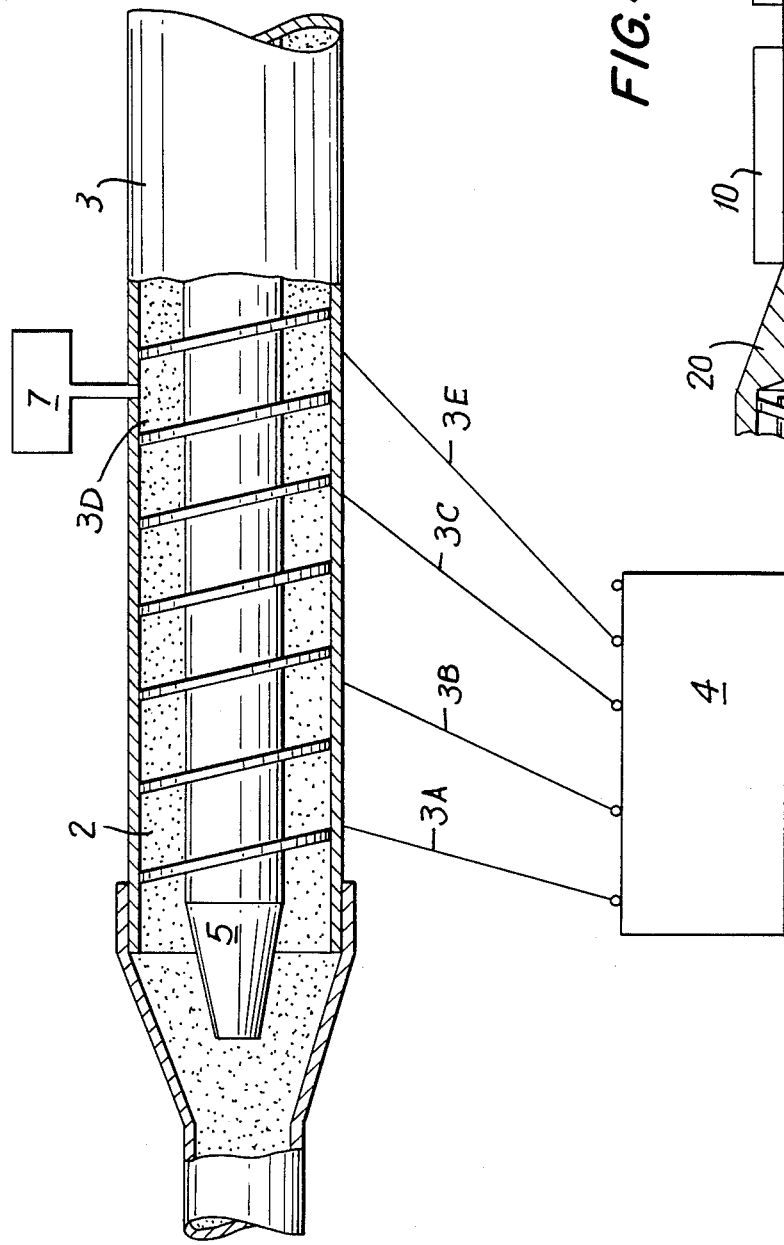
FIG. 3 is a partial sectional view of a primary extruder or heating tunnel for processing low-density polyethylene in accordance with the process of the present invention.
Figure 4:
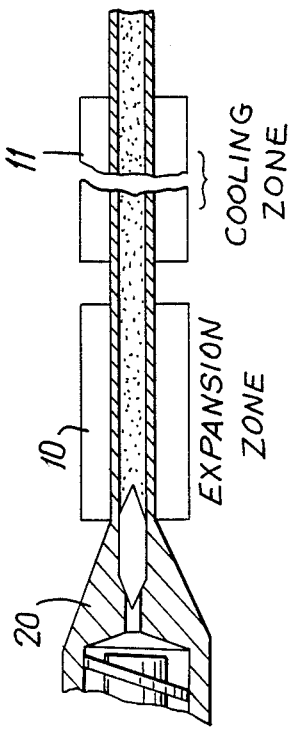
FIG. 4 is a schematic view of expansion and cooling zones subsequent to extrusion of polyethylene processed in accordance with the present invention.

In accordance with the present invention, and as schematically shown in the drawings, a low density polyethylene prepared by conventional process is mixed, for example in a hopper 1, with a first blowing agent, a surface activation agent and, preferably, a separation agent to form a dry mixture 2. The dry mixture 2 is conveyed to a closed heat tunnel 3, where it is processed in a series of stages at different temperatures. A conventional thermocouple control box 4 can be used to maintain a particular required temperature in each of the processing stages in the heat tunnel 3.

A conventional coil or screw conveys the mixture through a first portion 3A of the heat tunnel A pressure box 6 at the entry end of the heat tunnel provides pressurized air to assist in conveying the mixture through the heat tunnel.

In the first stage 3A of the heat tunnel, the mixture is heated at a temperature of, for example, about 170° C. to form a melted and softened polyethylene mass. In a second stage 3B of the heat tunnel, the melted mass is heated at a temperature, depending on the gasifying temperature of the blowing agent, sufficient to gasify the blowing agent and further melt the mass. The blowing agent and air begin to penetrate the cells of the melted low density polyethylene mass and cell expansion occurs Gasifying of certain blowing agents releases nitrogen and carbon monoxide, which react to form carbon dioxide. The carbon dioxide then penetrates the cells of the low density polyethylene, causing foaming and expansion of the cells, i.e. blowing.

In a third stage 3C of the heat tunnel, the expanded polyethylene is treated at a temperature of, for example, about 150° C. to partially shrink and harden the expanded cells of the mass.

A low density polyethylene (LDPE) is well-known in the art and is characterized by a density ranging from about 10 to about 40 lbs/ft$^3$ and a density ratio of about 0.910 to about 0.925 as compared to water, where water is considered to have a density of 1. Higher density polyethylenes are not suitable for use in the invention.

Suitable blowing agents to be initially mixed with the low density polyethylene, preferably in powder form, include axodicarbonamide (commercially-available as Celogen AZ Kempore, gasifying temperature of about 195° C.), N,N'-dinitrosopentamethylene-tetramine (commercially-available as Unicel NDX, gasifying temperature of about 195° C.), and 4,4' Oxybis (commercially-available as Celogen OT, gasifying temperature of about 150° C. The amount of blowing agent added is substantially about 1% by weight of the polyethylene. Amounts of blowing agent substantially greater than about 1% are not useful for purposes of the present invention because an overexpansion of the polyethylene cells takes place. Similarly, amounts of blowing agent substantially less than 1% do not permit sufficient cell expansion for purposes of the present invention.

Azodicarbonamide is the preferred initial blowing agent, especially when making linings for garments, sleeping bags and other articles worn or used intimately It is odorless, non-toxic, causes no discoloration of the final product and creates a maximum amount of gas for blowing. Comparatively, azodicarbonamide yields about 220 cc of gas per gram of solid, whereas 4,4' oxybis yields only 130 cc/g and N,N'-dintrosopentaethylene-tetramine 210 cc/g.

Suitable surface activation agents to be initially mixed with the low density polyethylene, preferably in powder form, include zinc oxide, cadmium oxide and calcium carbonate. The surface activation agent is added in an amount ranging from about 0.1 to about 0.2% by weight of the polyethylene.

The surface activation agent performs several important functions. First, it activates the blowing process while preventing too rapid an expansion of the LDPE cells during blowing. Secondly, it keeps the temperature in the heating tunnel 3 down during the blowing process. For example, where azodicabonamide is used as the blowing agent, the surface activation agent assists in maintaining a temperature of around 150° C. in the third stage 3C of the heating tunnel 3. Absent this agent, the gasified blowing agent would raise the temperature to around 196° C., causing excessive blowing not contemplated by the present invention.

It is preferred, but not essential, to add a separating agent in the initial mixing step. A suitable separating agent to be initially mixed with the low density polyethylene is ZnC. The separating agent, added preferably in powder form, aids in preventing the LDPE from sticking to the coil 5 or walls of the heating tunnel 3. The amount of separating agent added is substantially about 0.3% by weight of the polyethylene.

In a fourth stage 3D of the heating tunnel, a gaseous blowing agent 7 is introduced into the polyethylene mass to subject the mass to a second phase of cell expansion and strengthen the bubbled cells of the mass. This second blowing agent is introduced at a pressure of about 35 kg/cm$^2$.

The preferred gaseous blowing agent is Freon, the well-known trademark for dichlorofluoromethane, although liquid petroleum gas (LPG) or a mixture of freon and liquid petroleum gas may be used. Other suitable gaseous blowing agents include monochlorodifluoromethane and dichlorodifluoroethane. The advantage to using LPG is its inexpensiveness, although it has potentially toxic effects. Accordingly, in making an expanded polyethylene for linings of garments, sleeping bags, etc., it is preferable to use blowing agents having no potentially toxic effects.

After the introduction of the gaseous blowing agent and additional expansion of the polyethylene mass, the mass is subjected in a fifth stage 3E of the heating tunnel to a temperature of about 100° C., wherein it begins to cool. Treatment of about 100° C. prepares the mass for proper and efficient cutting. This completes the heating and blowing process.

The first through fifth stages 3A to 3E in the heating tunnel 3 take from about 30 minutes to about 1 hour to complete, each stage taking approximately the same amount of time.

The expanded mass continues its travel through a second portion 8 of the heating tunnel which does not have any coil or screw therein.

In this second portion 8 of the heating tunnel, a desired quantity of the expanded mass is cut, for example, by a conventional cutting blade 9. The expanded mass is still in a softened state. The desired quantity depends, of course, on the size of the final sheet or tube desired.

The cut, expanded mass is next subjected to a temperature 8A of about 105° C. in the heating tunnel and extruded through a die and mandrel 20 into a free expansion zone 10 and cooling zone 11 at atmospheric pressure and room temperature. The temperature of the mass must be raised slightly after cutting because a temperature of about 100° C. is too cool for proper extruding. After extrusion, the foamed polyethylene mass expands naturally in the atmosphere, but not explosively, and cools at room temperature for a short period, e.g., a few seconds. The cooling mass of polyethylene is then formed into a sheet 12 by conventional means 13, or into a tube (not shown) by conventional means, the thickness or diameter, respectively, being determined by the desired end use of the product.

The sheet 12 or tube can then be wound on rolls, 25 after which it is cooled at room temperature (20° C. to 30° C., preferably 25° C.) for at least 24 hours. The sheet or tube goes through two stages during this 24 hour cooling period. Initially, the cells of the expanded mass collapse as entrapped blowing agent and air work their way out of the cells. Subsequently, over the 24 hour period, air repenetrates the cells to expand them to an intermediate stage.

The final product is a low density polyethylene in which innumerable small cells containing air form a close-packed network. The weight of the final product corresponds to the weight of the initial low density polyethylene. Thus, for example, 25 kg of low density polyethylene yield 25 kg of finished sheeting.

The present invention thus provides a foamed, expanded low density sheet or tube of polyethylene of the formula $-(CH_2-CH_2)-$ having a weight ranging from about 12 g/yd$^2$ to about 21 g/yd$^2$ for sheets of thicknesses ranging from about 0.5 mm to about 1 mm. The sheet is characterized by superior buoyancy and thermal-resistant properties. For example, 300 grams of the finished product can float more than 130 kg of weight. The density ratio of the final product ranges from about 0.4 to about 0.55 as compared to water, where water is considered to have a density of 1. Additionally, the sheet or tube of low density expanded and foamed polyethylene is cold-resistant, water-repellent and moisture resistant.

The expanded and foamed low density polyethylene of the present invention can be formed into a sheet having any thickness, but preferably a thickness ranging from about 0.5 mm to about 5 mm. For garments, the thickness of the sheet should be no less than about 0.5 mm and no more than about 1 mm. Sheets having thicknesses much less than 0.5 mm do not possess sufficient buoyancy to be practical for use in the invention. Conversely, sheets having thicknesses much greater than about 1 mm are not suitable for use in garments of the present invention, because they make for an uncomfortable garment. Where sheets of low density polyethylene according to the present invention are intended for use as liners in tents, sleeping bags, blankets and similar equipment, thicknesses up to about 5 mm may be advantageously used without making the equipment unduly bulky and cumbersome.

During the mixing step, conventional additives can be added in appropriate amounts to impart additional characteristics to the final product, such as a fireproofing anti-inflammatory agent such as tin. These conventional additives increase the weight of the final product but do not significantly affect the buoyancy or thermal characteristics of the final product. Exemplary additives include about 0.1% to about 0.2% by weight of the polyethylene of cross linking agents such as azobisformamide (ABFA) or dicumyl peroxide, which can be added in powder form to increase the resistance of the final product to tearing, as well as about 0.1% of an ultra-violet absorber to prevent discoloration. After the foamed and expanded polyethylene is formed into sheets, or simultaneous with the sheet-forming step, the polyethylene may be sandwiched between opposed sheets of a material such as a nylon, vinyl, plastic, gauze, sheer fabric, or any material covering. Since the polyethylene is still in a somewhat softened state at this point, the sandwiching material adheres slightly to the polyethylene. More importantly, sandwiching at this point facilitates the process of sewing a material cover to the polyethylene, as well as cutting and transporting of the final product. Additionally, such a material cover prolongs the durability of the sheet.

No special conditions are required for storage of the low density foamed polyethylene produced in accordance with the invention, even during the final 24 hour cooling period, in view of the water-repellent and moisture-resistant properties of the product.

Additionally, there is no waste of polyethylene in the process For example, 10 grams of low density polyethylene starting material yields 10 grams of expanded and foamed low density polyethylene produced in accordance with the invention.

The diameter of the polyethylene tubes produced in accordance with the present invention varies according to the end use. The extruded tubes may be solid or hollow and find particular use in providing buoyant material around boats.

The following example illustrates an application of the principles of the present invention. However, it is not intended and should not be construed as limiting the scope of the invention.

EXAMPLE 25 kg of low density polyethylene are mixed in a hopper with 250 g of azodicarbonamide, 40 g of zinc oxide, and 75 g of ZnC. The mix is fed into a heating tunnel containing a helical screw which feeds the mix through the tunnel. Air fed from a pressure box assists in conveying the mix. The mix is heated at 170° C. in a first stage of the tunnel where it melts. The melted mass travels to a second stage of the tunnel, maintained at a temperature of 200° C., where the azodicarbonamide gasifies and penetrates and expands the polyethylene cells. The mass is then subjected to a temperature of 150° C. in a third stage to cool the mass, whereby the cells harden and shrink slightly. Freon is then introduced at 35 kg/cm$^2$ to further expand and foam the mass. The temperature of the mass is next lowered to 100° C. to condition the mass for cutting. The mass is cut with a cutting blade such that it severs from the next batch following it through the tunnel. The temperature of the mass is raised to 105° C. to prepare the mass for extrusion. The mass is extruded into an ambient atmosphere at a room temperature of 25° C. Expansion takes place, but the mass does not explode. The extruded mass cools for a few seconds and then passes through rollers to form a sheet having a thickness of 1 mm. The continuous sheet is formed into 4 rolls and stored at 25° C. for 24 hours. The final product is 4 rolls of expanded and foamed polyethylene having a thickness of 1 mm, with 300 m to the roll, a weight of 21 g/yd$^2$, a thermal transmittance of 6.70 w/m$^2$C and a thermal transmission of 52.5% (ASTMD 1518) and a water absorption of $9.1 \times 10^{-4}$ lb/ft (BS 3595-1969). 300 g of the finished sheet keeps more than 130 kg of body weight afloat.

The foamed and expanded low density polyethylene of the present invention finds a multitude of uses as linings for garments, sleeping bags, blankets, cushions and sports and leisure equipment such as tents, bags, backpacks, rafts and deck chairs and other related items. Since the low density polyethylene product of the present invention combines both superior flotation ability and thermal resistance, the need to dispatch additional safety gear on the water is eliminated. A single garment incorporating the lining of the present invention serves as both a thermal jacket against the elements and a flotation device for general flotation and emergencies. Morever, the present invention provides a lightweight and thin garment for the above purposes which is comfortable and not cumbersome, thus improving enjoyment as well as safety.

The present invention provides a lining and garment which retains its buoyancy and flotation ability even when ripped or torn. Also, blankets and sleeping bags can be provided with buoyant properties to serve additionally as flotation devices. The cumbersome safety vest used, for example, by water skiers can be replaced by a thin and lightweight safety vest, thus improving safety and maneuverability in leisure sports.

Conventional hunting, fishing, camping and military clothing and related equipment can be dramatically improved by the instant invention, resulting, for example, in a single garment that can be worn in the countryside which is thermally insulated and immediately usable in emergency flotation situations varying from accidentally falling into a river to the need to ford a stream. Application of the present invention to military uniforms, jackets and ponchos morever extends a soldier's capabilities in battle situations. The polyethylene product of the present invention can also be used as thermal insulation, for example, for military radio equipment and the like.

It will be appreciated that while the present invention has been described with reference to specific and preferred embodiments thereof, this is not done by way of limitation, and various modifications will suggest themselves to those of ordinary skill in the art which fall within the spirit and scope of the present invention as set forth in the appended claims.

I claim:

1. A method of producing a flexible low-density polyethylene sheet or tube possessing superior buoyancy, cold-resistance and water-repellency comprising:
    (1) mixing low density polyethylene in a hopper with about 1% by weight of azodicarbonamide as a blowing agent, about 0.1 to 0.2% by weight of a surface activation agent and about 0.3% by weight of zinc carbide as a separation agent to form a dry particulate mixture;
    (2) conveying the mixture, under air pressure provided from a pressure box, from said hopper and through a screw conveyor provided in a first portion of a heat tunnel while;
        (i) heating the mixture to a temperature of about 170 degrees C. to form a softened mass;
        (ii) raising the temperature of the softened mass to about 200 degrees C. to gasify the blowing agent for foaming and expanding the low density polyethylene to form gas-filled cells within the softened mass;
        (iii) reducing the temperature of the foamed and expanded polyethylene mass to about 150 degrees C. to partially shrink and harden the gas-filled cells;
        (iv) introducing gaseous dichlorofluoromethane as a blowing agent into the polyethylene mass for additional foaming and expansion of the polyethylene mass to strengthen the gas-filled cells of the mass; and
        (v) cooling the mass to a temperature of about 100 degrees C. to prepare the mass for cutting;
    (3) cutting a predetermined quantity of the polyethylene mass in a second portion of said heat tunnel to form a cut mass;
    (4) conveying the cut mass through a screwless conveyor provided in the second portion of said heat tunnel while reheating the cut mase to a temperature of about 105 degrees C. to prepare the mass for extruding;
    (5) extruding the reheated mass from the screwless conveyor out of a die into a free expansion zone at atmospheric pressure and room temperature, whereby the gas-filled cells expand naturally but not explosively at room temperature and pressure;
    (6) forming the extruded mass into a sheet or tube; and
    (7) cooling the sheet or tube at room temperature for at least 24 hours to provide a flexible low density polyethylene sheet or tube characterized by superior buoyancy and thermal resistance.

2. A method as in claim 1, wherein said low density polyethylene has an additional density of about 10 to 40 $lbs/ft^3$.

3. A method as in claim 1, wherein said surface activation agent is selected from the group consisting of zinc oxide, cadmium oxide and calcium carbonate.

4. A method as in claim 1, wherein said dichlorofluoromethane is introduced into said polyethylene mass at a pressure of about 35 $kg/cm^2$.

5. A method as in claim 1, wherein the extruded mass is formed into a sheet having a thickness after cooling ranging from about 0.5 mm to about 1.0 mm.

6. A method as in claim 1, wherein the extruded mass is formed into a sheet having a thickness after cooling of up to about 5.0 mm.

7. A method as in claim 5, further comprising sandwiching said sheet between opposed layers of material before the final cooling to facilitate subsequent handling and processing of the formed sheet.

8. A method as in claim 1, wherein the sheet or tube is cooled at a room temperature of about 20 degrees C. to about 30 degrees C. to initially shrink the gas-filled cells and thereafter allow the cells to return to an expanded state.

9. A method as in claim 1, wherein said mixture is conveyed through said screw conveyor for a total time of from about 30 minutes to about one hour.

* * * * *